United States Patent
Keidar (10) Patent No.: US 9,607,178 B2
(45) Date of Patent: Mar. 28, 2017

(54) PROTECTION AGAINST KEY TAMPERING

(71) Applicant: QUALCOMM INCORPORATED, San Diego, CA (US)

(72) Inventor: Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/220,937

(22) Filed: Mar. 20, 2014

(65) Prior Publication Data

US 2015/0269385 A1 Sep. 24, 2015

(51) Int. Cl.
*G06F 21/79* (2013.01)
*H04L 9/00* (2006.01)

(52) U.S. Cl.
CPC .............. *G06F 21/79* (2013.01); *H04L 9/004* (2013.01)

(58) Field of Classification Search
CPC .................................................... G06F 21/602
USPC ......................................................... 713/189
See application file for complete search history.

(56) References Cited

U.S. PATENT DOCUMENTS

| | | | | |
|---|---|---|---|---|
| 6,151,624 | A * | 11/2000 | Teare et al. .................... | 709/217 |
| 6,763,426 | B1 * | 7/2004 | James et al. ................... | 711/108 |
| 6,785,677 | B1 * | 8/2004 | Fritchman | |
| 8,196,197 | B2 * | 6/2012 | Cannizzaro et al. ........... | 726/18 |
| 2009/0060197 | A1 * | 3/2009 | Taylor ................... | H04L 9/0618 380/277 |
| 2011/0055922 | A1 * | 3/2011 | Cohen et al. .................... | 726/22 |
| 2012/0131169 | A1 * | 5/2012 | Mouraveiko ................. | 709/223 |
| 2012/0246442 | A1 | 9/2012 | Dolgunov et al. | |
| 2012/0272303 | A1 * | 10/2012 | Liu .................................... | 726/6 |
| 2012/0272330 | A1 * | 10/2012 | Soghoian et al. .............. | 726/26 |
| 2013/0061320 | A1 | 3/2013 | Austin | |
| 2013/0298251 | A1 | 11/2013 | Mittal | |
| 2013/0312110 | A1 | 11/2013 | Boulet et al. | |
| 2013/0339739 | A1 | 12/2013 | Hueber et al. | |

OTHER PUBLICATIONS

NIST(Sample Generic Policy and High level Procedures, Aug. 2, 2000, 3 pages).*
International Search Report and Written Opinion—PCT/US2015/018173—ISA/EPO—Nov. 23, 2015.
Santos J.C.M., et al., "Micro-Architectural Support for Metadata Coherence in Multi-Core Dynamic Information Flow Tracking", Hardware and Architectural Support for Security and Privacy, ACM, 2 Penn Plaza, Suite 701, New York, NY, 10121-0701, USA, Jun. 23, 2013 (Jun. 23, 2013), pp. 1-8, XP058021354, DOI: 10.1145/2487726.2487732, ISBN: 978-1-4503-2118-1.
Huygens: "How Often Should an SSH Key Pair be Changed?—Information Security Stack Exchange", May 16, 2012 (May 16, 2012), XP55267047, Retrieved from the Internet: URL:http://security.stackexchange.com/questions/14983/how-oftenshould-an-ssh-key-pair-be-changed [retrieved on Apr. 20, 2016].
Written Opinion—PCT/US2015/018173—ISA/EPO—Apr. 28, 2016.

* cited by examiner

*Primary Examiner* — Oleg Korsak
(74) *Attorney, Agent, or Firm* — Blakely Sokoloff Taylor & Zafman, LLP (57) ABSTRACT

Disclosed is an apparatus and method to protect against key tampering. A computing device may include a cryptoprocessor that is configured to: write a first word including a first portion of a key; and write a plurality of subsequent words each including a portion of the key. If a same word is written more than once, the key is reset and not validated.

30 Claims, 5 Drawing Sheets

PROTECTION AGAINST KEY TAMPERING

BACKGROUND

Field

The present invention relates to an apparatus and method to protect against key tampering.

Relevant Background

A cryptoprocessor may be a co-processor that performs computationally intensive encoding and decoding of information for a central processing unit (CPU) based upon an extended language or may be a cryptoengine that is a separate piece of hardware (e.g., an accelerator processor) that is run by a dedicated software driver for the encoding and decoding of information. A cryptoprocessor may be used to store keys for encryption and decryption. This information typically is write-only, meaning that no one (e.g., software applications) can read it, even the one that wrote the information.

However, an attacker may try to overwrite part of a key in order to collect information about the key. Additionally, an attacker may try to modify metadata associated with a key that defines what can be done with the key, what execution environments or processes can use the key, and which domains are allowed for use with the key.

Unfortunately, these types of attacks may be very destructive to computing devices that utilize cryptoprocessors, and may cause problems, such as: severe fines, loss of contracts, revocation of entire products lines, diminished brand value, etc.

SUMMARY

Aspects of the invention may relate to an apparatus and method to protect against key tampering. A computing device may include a cryptoprocessor that is configured to: write a first word including a first portion of a key; and write a plurality of subsequent words each including a portion of the key. If a same word is written more than once, the key is reset and not validated.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
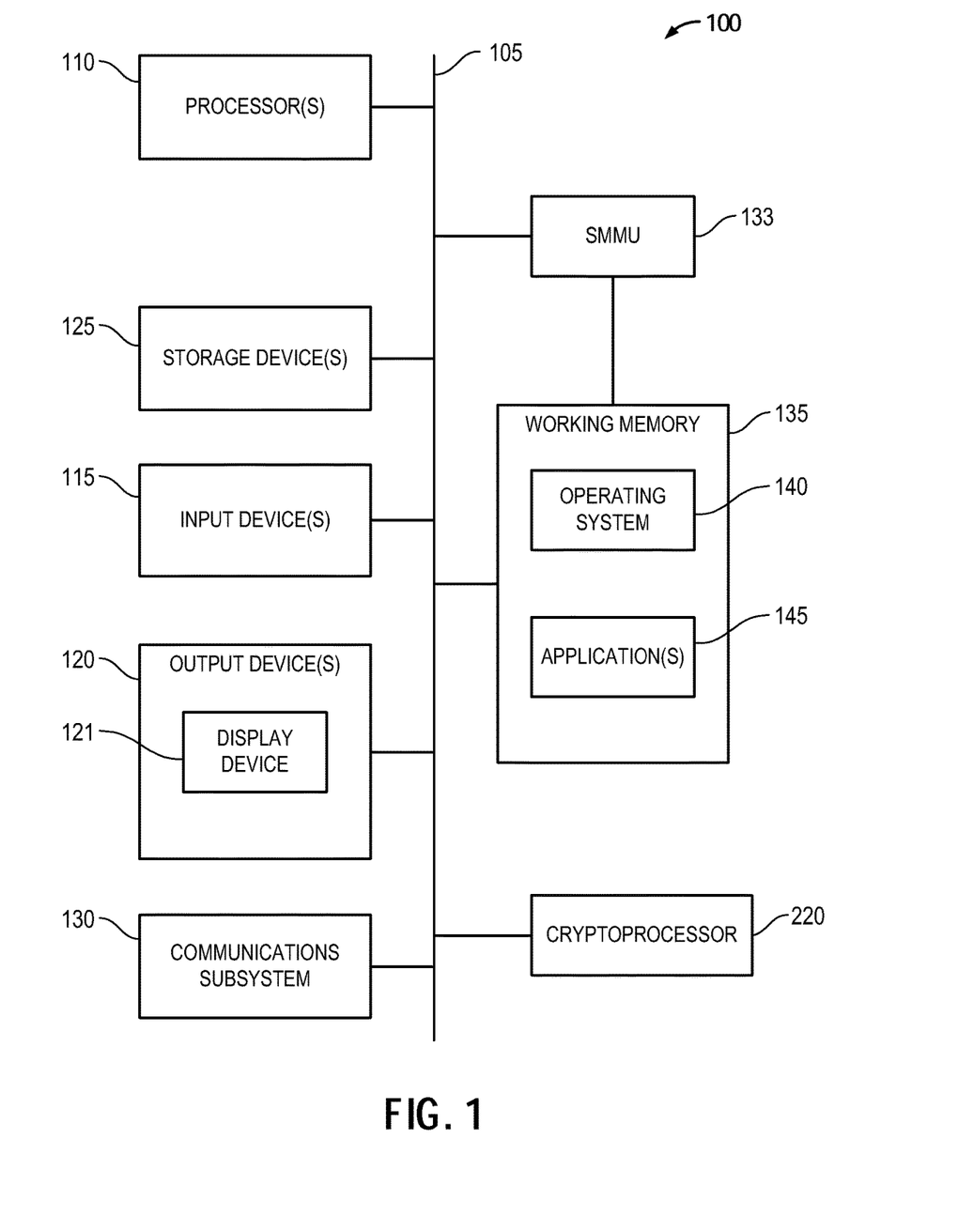
FIG. 1 is a diagram of a computing device in which aspects of the invention may be practiced.

An example computing device 100 that may be utilized to validate or not validate a key, in which aspects of the invention may be practiced, as will be hereinafter described in detail, is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, cryptoprocessors, and/or the like); one or more input devices 115 (e.g., keyboard, keypad, touchscreen, mouse, etc.); and one or more output devices 120, which include at least a display device 121, and can further include without limitation a speaker, a printer, and/or the like.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device 100 may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computer systems, and/or any other devices described herein. In many embodiments, the computing device 100 will further comprise a working memory 135, which can include a RAM or ROM device, as described above. Further, the computing device 100 may include a system memory management unit (SMMU), which is a computer hardware unit that has memory references passed through it, and may be used to perform the translation of virtual memory addresses to physical addresses, in order implement applications. The computing device 100 may also comprise software elements, shown as being currently located within the working memory 135, including an operating system 140, applications 145, device drivers, executable libraries, and/or other code.

Merely by way of example, one or more procedures described with respect to the method(s) discussed below may be implemented as code and/or instructions executable by a computing device (and/or a processor within a computing device); in an aspect, then, such code and/or instructions can be used to configure and/or adapt a general purpose computer (e.g., a computing device) to perform one or more operations in accordance with the described methods, according to embodiments of the invention. As one particular example, as will be described in more detail hereinafter, a cryptoprocessor may implement embodiments of the invention to validate or not validate a key. A set of these instructions and/or code might be stored on a non-transitory computer-readable storage medium. In some cases, the storage medium might be incorporated within a computer device, such as computing device 100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

Further, as particularly shown in FIG. 1, computing device 100 may include a cryptoprocessor 220 that may be utilized to validate or not validate a key, to protect against key tampering, as will described in more detail hereinafter. Cryptoprocessor 220 may be a co-processor that performs computationally intensive encoding and decoding of information for a central processing unit (CPU) (e.g., 110) or other processor based upon an extended language or may be a cryptoengine that is a separate piece of hardware (e.g., an accelerator processor) that is run by a dedicated software driver for the encoding and decoding of information.

Figure 2:
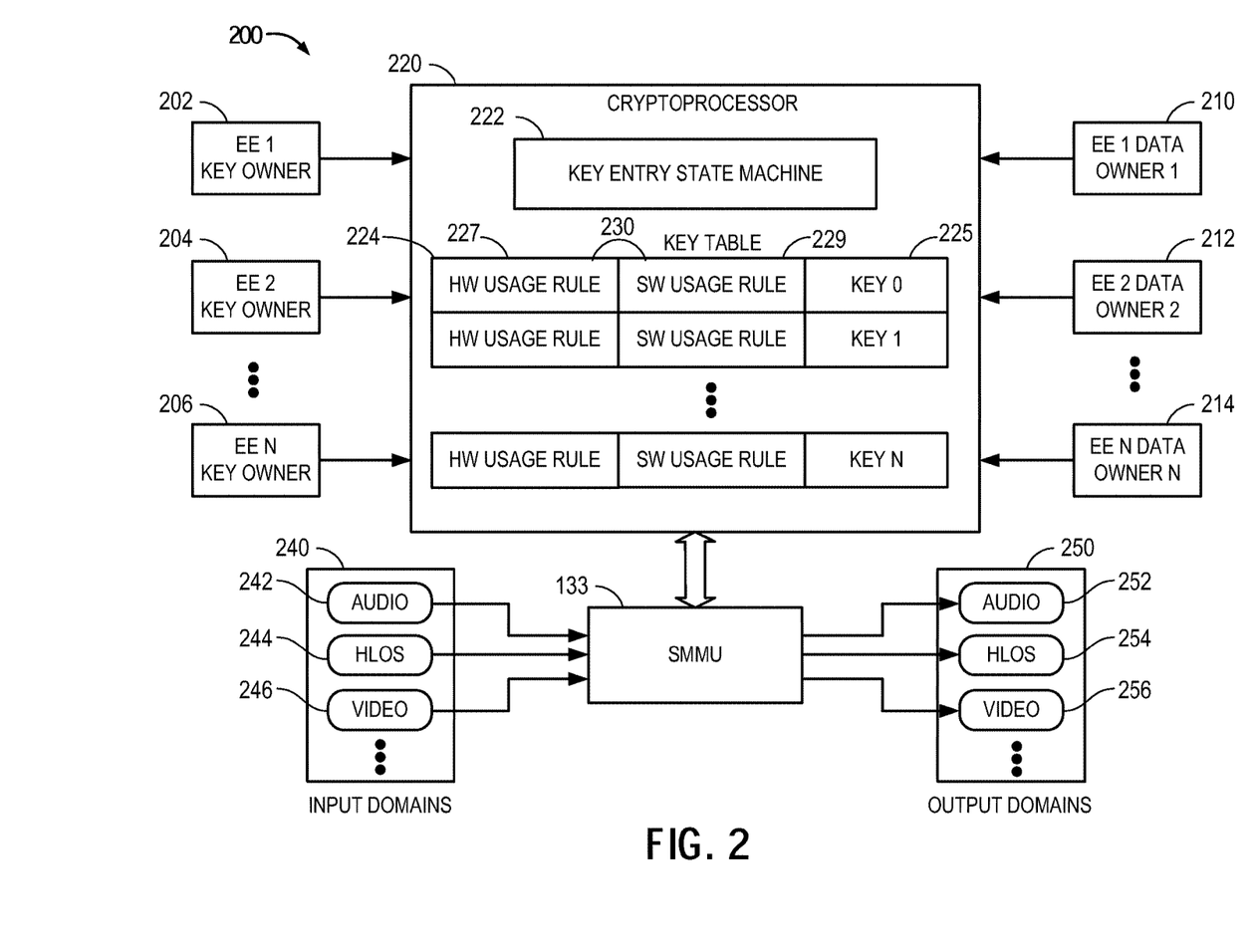
FIG. 2 is an example of a computing environment that includes a cryptoprocessor to validate or not validate key.

With reference to FIG. 2, an example of a computing environment 200 implementable by computing device 100 that includes a cryptoprocessor 220, to validate or not validate a key, in which aspects of the invention may be practiced, will be hereinafter described. Cryptoprocessor 220 may be either a co-processor that performs computationally intensive encoding and decoding of information for a CPU (or other processor) based upon an extended language or may be a cryptoengine that is a separate piece of hardware (e.g., an accelerator processor) that is run by a dedicated software driver for the encoding and decoding of information. In this example, cryptoprocessor 220 is a cryptoengine, and examples hereinafter described, will be in the context of implementation by a cryptoengine. However, as should be apparent to those of skill in the art, these same implementations may be similarly performed by a co-processor. In this example implementation, various execution environment key owners (EE1-EEN) 202, 204, 206 that control keys to encrypt and decrypt data operate in cooperation with various execution environment data owners (EE1-EEN) 210, 212, 214. The execution environments utilizing keys may securely communicate data for input and output by the computing device. In particular, data may be encrypted and decrypted via keys 225 in key table 224 of the cryptoprocessor 220. Encrypted or decrypted data may be provided to input domains 240 or output domains 250 via SMMU 133. Example input domains 240 include audio data 242, high level operating system data (HLOS) 244, and video data 246, whereas similarly, example output domains 250 include audio data 252, high level operating system data (HLOS) 254, and video data 256. It should be appreciated that these are just example domains, and many different types of domains may be utilized (e.g., enterprise, modem, etc.). Moreover, many different types of execution environments may be utilized, the previously-described ones, being merely examples.

As one example, execution environment 1 may be for video data and may include EE1 key owner 202 and EE1 data owner 1 210. Input video data 246 for data owner 201 may need to be decrypted by cryptoprocessor 220 with a key 225 in key table 224 associated with the EE1 key owner so that it may be displayed in the output domain 256. In this example, cryptoprocessor 220 may include key entry state machine 222 (to be hereinafter described) and a key table 224. Key table 224 may include keys (0-N) 225 and associated usage rules (e.g., hardware usage rules 227 and software usage rules 229). Hardware and software usage rules 227 and 229 may be referred to as metadata 230, which also defines the domains that can be utilized. Each execution environment (including the key owner and data owner) may have an assigned group in key table 224 that includes a key 225 and hardware and software usage rules 227 and 229 that further define the domains associated with the execution environment. Continuing with this example, a video execution environment (e.g., key owner 202 and data owner 210) may request that encrypted video data 246 be decrypted by cryptoprocessor 220 with the associated key 225 of the key table 224 for the video execution environment so that the video data 256 can be output to the output domain 250 for display. It should be appreciated that this is but one example of the operation of the cryptoprocessor 220 (that may be used to encrypt or decrypt data) and that many different types of execution environments, types of data, types of domains, etc., may be utilized with the cryptoprocessor.

Keys 225 in the key table 224 of the cryptoprocessor 220 often need to updated and validated by execution environments. For example, an execution environment key owner 202 often requests a key to be updated and validated. Until the key 225 is updated and validated, data for the execution environment data owner 210 cannot be encrypted or decrypted. However, keys need to be updated and validated in a secure fashion to prevent attackers from obtaining data about the keys.

According to one embodiment of the invention, cryptoprocessor 220 may be configured to: write a first word including a first portion of a key; and write a plurality of subsequent words each including a portion of the key; and if a same word is written more than once and, optionally, if a word is written out of order, the key is reset. Also, if part of the key is not written, the key cannot be validated. Moreover, if a word is written to an already valid key, the key is reset and associated metadata is invalidated. For example, an updated or new key may be requested by an execution environment key owner 202. If a same word is not written more than once and, optionally, a word is not written out of order, the cryptoprocessor 220 performs a key validation process. As part of the key validation process, the cryptoprocessor 220 determines if metadata 230 associated with the key satisfies system privileges, and if so, the key is validated. As has been previously described, the associated metadata 230 may includes usage rules such as hardware usage rules 227 and software usage 229 rules. If the key is validated, the key 225 and the associated metadata 230 are written to the key table 224 of the cryptoprocessor 220. The key 225 may then be utilized by the cryptoprocessor 220 to encrypt and decrypt data from a data owner 210 for use in a particular domain. As an example, if the associated metadata 230 (hardware and software usage rules) satisfies system privileges (e.g., for video processing), the key 225 is validated and written to the key table 224, along with the hardware and software usage rules 227 and 229, such that execution environment data owner 210 can utilize the cryptoprocessor 220 to utilize video data for encryption and decryption. As an example, video data 246 can be decrypted and outputted to the output domain 250 for viewing on a display.

Figure 3A:
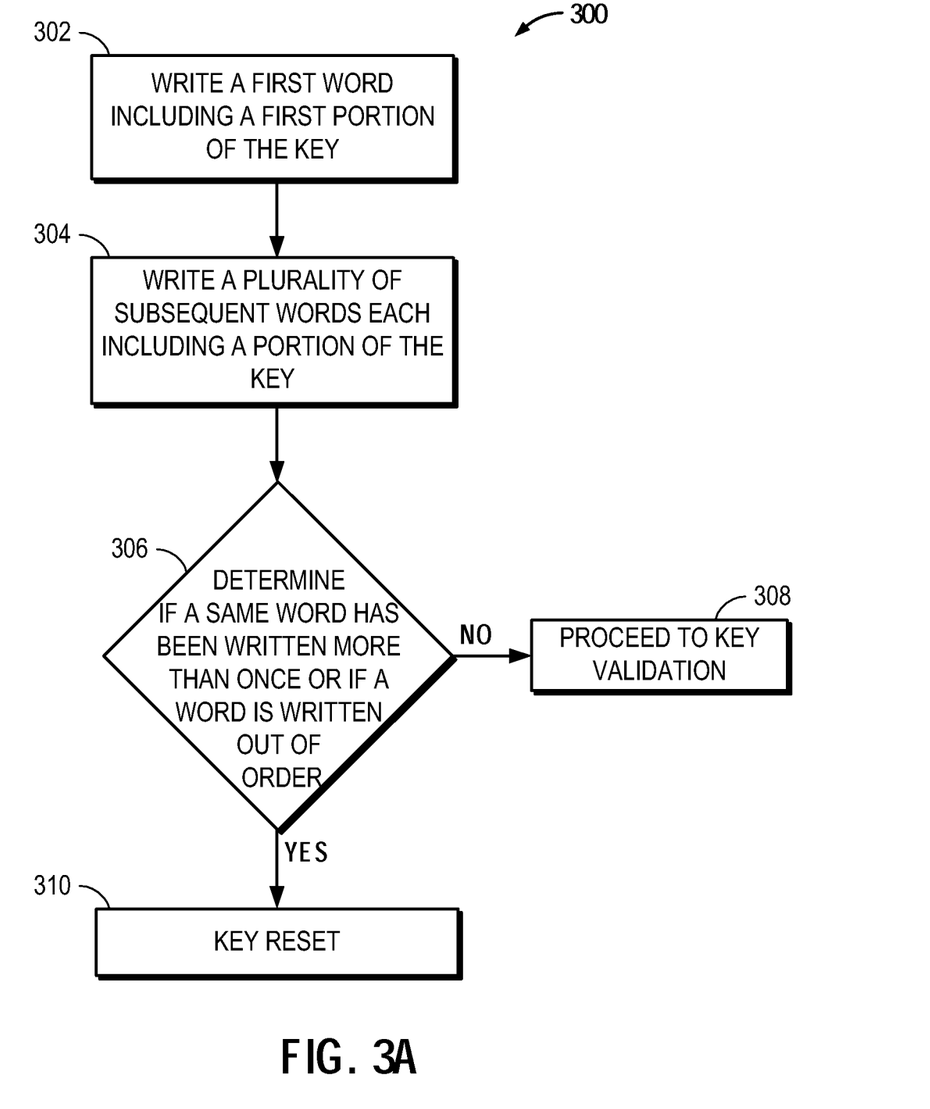
FIG. 3A is a flow diagram illustrating an example of a method to validate or not validate a key.

With additional reference to FIG. 3A, FIG. 3A is a flow diagram illustrating an example of a method process 300 to validate or not validate a key, according to one embodiment of the invention. At block 302, a first word including a first portion of the key is written. At bock 304, a plurality of subsequent words each including of a portion of the key are written. Next, at block 306, process 300 determines whether a same word has been written more than once or, optionally, if a word has been written out of order. If so, at block 310, the key is reset (i.e., not validated). If not, process 300 proceeds to key validation. During key validation, the cryptoprocessor 220 determines if metadata associated with the key satisfies system privileges, and if so the key is validated. As has been previously described, the associated metadata may include usage rules such as hardware usage rules and software usage rules. If the key is validated, the key 225 and the associated metadata 230 are written to the key table 224 of cryptoprocessor 220. In this way, it is assured that every bit in the key 225 and its associated metadata 230 is written once and only once, wherein, if all the bits do not meet the criteria, key 225 cannot be used. Assuming validation, key 225 may then be utilized by the cryptoprocessor 220 to encrypt and decrypt data from a data owner 210 for use with a particular domain.

Figure 3B:
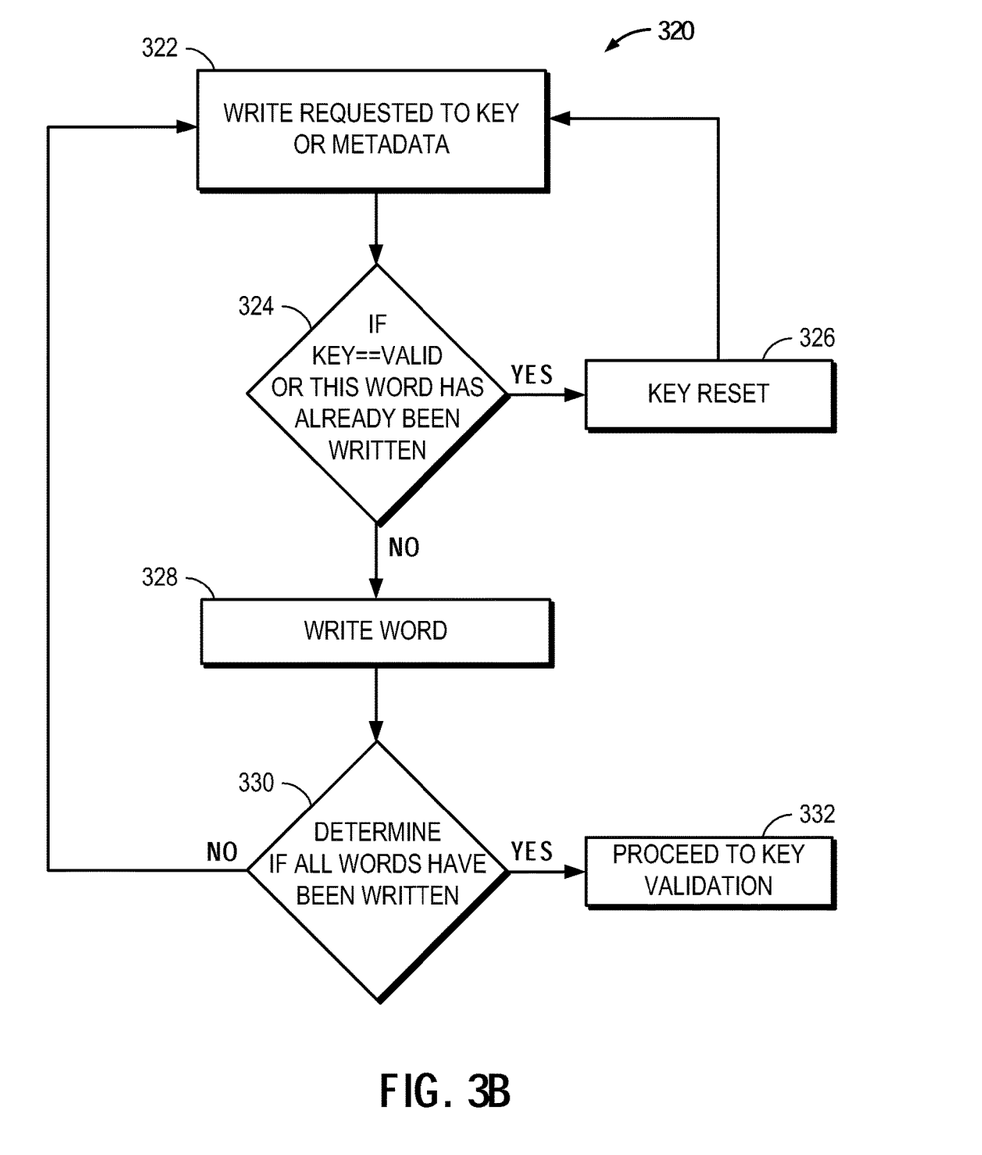
FIG. 3B is a flow diagram illustrating an example of a method to validate or not validate a key, according another embodiment.

With additional reference to FIG. 3B, FIG. 3B is a flow diagram illustrating another example of a method process 320 to validate or not validate a key, according to one embodiment of the invention. At block 322, a write is requested to a key 225 or metadata 230. At decision block 324, process 320 determines whether the word is being written to an already valid key or whether the word has already been written, and if so, the key is reset (block 326) and the process 320 begins again (block 322). On the other hand, if it is determined that the word is not being written to an already valid key or that the word has not already been written, then, the key is not reset, and the word is written (block 328). Next, at decision block 330, process 320 determines if all the words have been written, and if so, the process proceeds to key validation (block 332). If all the words have not been written, then process 320 proceeds back to block 322.

Figure 4:
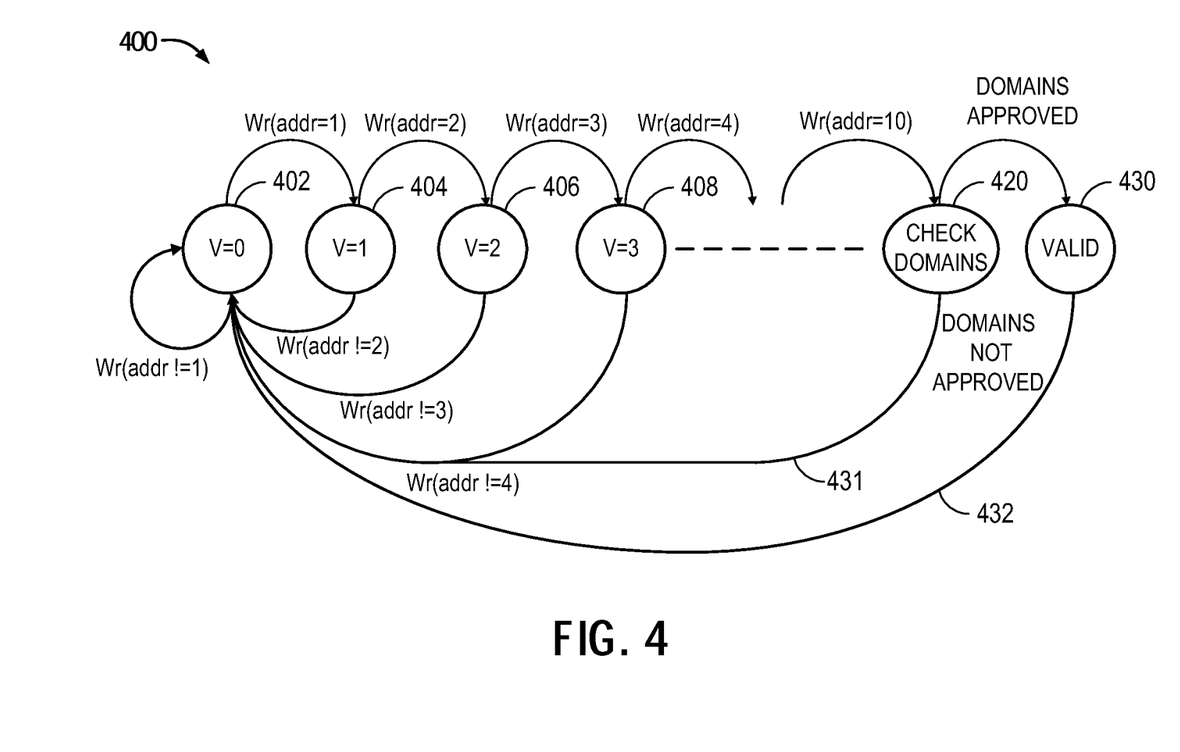
FIG. 4 illustrates a key entry state machine process to validate or not validate a key.

With additional reference to FIG. 4, FIG. 4 illustrates a key entry state machine process 400 to validate or not validate a key, according to one embodiment of the invention. In one embodiment, a key entry state machine 222 implemented by the cryptoprocessor 220 may perform the key entry state machine process 400. As an example, an updated or new key request may be requested by an execution environment key owner 202. As can be seen in FIG. 4, the key entry state machine process begins at step 402 where the state is empty and the state value is set to 0 (V=0). Next, the first word portion of the key is written (Wr(addr=1)) and process 400 moves to state 1 404 where the value is set to 1 (V=1). However, if the first word portion of the key is not properly written (Wr(addr!=1)), then the key is reset and process 400 moves back to step 402. Next, the second word portion of the key is written (Wr(addr=2) and process 400 moves to state 2 406 where the state value is set to 2 (V=2). However, if the second word portion of the key is not properly written (Wr(addr!=2)), then the key is reset and process 400 moves back to step 402. Similarly, next, the third word portion of the key is written (Wr(addr=3) and process 400 moves to state 3 408 where the state value is set to 3 (V=3). However, if the third word portion of the key is not properly written (Wr(addr!=3)), then the key is reset and process 400 moves back to step 402. This process is repeated to state 10 420, at which points the domains are checked.

At state 420, the domains are checked. As has been previously described, during this key validation process, the cryptoprocessor 220 determines if metadata (e.g., hardware and software usage rules) associated with the key satisfies system privileges and domain rules. If the system privileges are approved, the key is validated at step 430. If the system privileges are not approved, the key is reset and process 400 moves back to step 402 (e.g., see line 431). Also, if an attempt is made to modify an already valid key (430), such as, an attempt to write to a valid key, the key becomes invalid, and the entire key needs to be rewritten (e.g., see line 432). It should be appreciated any type of key of any type of size and of any type of algorithm (e.g., DES, F8, F9, AES, 3DES, HMAC, etc.) may be utilized.

By utilizing the previously described key entry state machine process 400 to validate a key and its metadata ensures the writing of the whole key information in the right order. Any out-of-order writes or the portions of the key being written more than once, results in the state machine process returning to the beginning state 402 (V=0) (e.g., reset and invalid).

However, it should be appreciated, that, in some embodiments, the out-of-order type of enforcement is not required. In this type of embodiment, the order of writing is not monitored. Instead, the only requirement could be a one-and-only-one write operation. For example, a first word including a first portion of the key is written and a plurality of subsequent words each including of a portion of the key are written by the cryptoprocessor 220. The cryptoprocessor 220 then determines whether a same word has been written more than once, and if so, the key is reset (i.e., not validated). If not, key validation occurs. It should be appreciated that, in this example, the order of writing is not monitored. During key validation, the cryptoprocessor 220 determines if metadata associated with the key satisfies system privileges, and if so the key is validated. It should be appreciated that the previously described processes of FIG. 3A, FIG. 3B, and FIG. 4 may be implemented by the cryptoprocessor 220, as well as a wide variety of similar or different processes. By utilizing the previously described methods, if an attacker attempts to try to change key data at the same time it is being written, this results in key entry state machine process 400 resetting the key (state 402). Further, once the sequence of writes is accomplished, the key and the metadata go through a validation process, where the domains are checked (step 420), and if the domains are accurate, only then, is the key validated and written as key 225 with associated metadata usage rules 230 to the key table 224 of the cryptoprocessor 220. Otherwise, the key is not validated and reset. Therefore, any attempt to modify valid key information or its metadata results in invalidation of the key.

It should be appreciated that various types of attacks may be prevented. For example, one type of attack that may be prevented is an attempt to modify the key while it is being written and is not yet validated (e.g., as seen in the validation steps of FIG. 4). This type of attack may be prevented by the enforcement of the rule in which the cryptoprocessor 220 determines whether a same word has been written more than once, and if so, the key is reset (i.e., not validated). Another type of attack that may be prevented is attempt modify an already valid key. As has been previously described, if the cryptoprocessor 200 determines that an attempt has been made to modify an already valid key, the key becomes invalid and is reset and needs to be rewritten (e.g., as seen by step 430 and line 432 of FIG. 4).

It should be appreciated that these types of enforcement rules provide tight coupling between the key 225 and its metadata 230. In this way, the key 225 and its associated metadata 230 are updated as a whole for extra security. These steps make it very difficult for an attacker to collect information about keys. Additionally, these steps make it very difficult for an attacker to modify metadata associated with a key.

Therefore, when cryptoprocessor 220 determines that the portions of the key have been written in order and portions of the key not written more than once, and, the cryptoprocessor 220 determines that metadata (e.g., hardware and software usage rules) associated with the key satisfies system privileges, the key is validated. Although, as previously described, the out-of-order type of enforcement is optional. Further, as has been previously described, the associated metadata 230 may includes usage rules such hardware usage rules 227 and software usage 229 rules. If the key is validated, the key 225 and the associated metadata 230 are written to the key table 224 of the cryptoprocessor 220. The key 225 may then be utilized by the cryptoprocessor 220 to encrypt and decrypt data from a data owner 210 for use in a particular domain. As an example, if the associated metadata 230 (hardware and software usage rules) satisfies system privileges (e.g., for video processing), the key 225 is validated and written to the key table 224, along with the hardware and software usage rules 227 and 229, such that execution environment data owner 210 can utilize the cryptoprocessor 220 to utilize video data for encryption and decryption. As an example, video data 246 can be decrypted and outputted to the output domain 250 for viewing on a display.

It should be appreciated that aspects of the invention previously described may be implemented in conjunction with the execution of instructions by processors (e.g., cryptoprocessor 220) of the device (e.g., computing device 100), as previously described. Particularly, circuitry of the devices, including but not limited to processors, may operate under the control of a program, routine, or the execution of instructions to execute methods or processes in accordance with embodiments of the invention (e.g., the processes and functions of FIGS. 3-4). For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computing device comprising:
 a hardware cryptoprocessor configured to:
  write a first word portion of a key, the key comprising a plurality of word portions; and
  write a plurality of subsequent word portions of the key;
  wherein, if a same word portion of the key is written more than once, the key is reset, and, if the key is validated, the hardware cryptoprocessor utilizes the key to encrypt and decrypt data.

2. The computing device of claim 1, wherein, if a word portion of the key is written out of order, the key is reset.

3. The computing device of claim 1, wherein if a word portion of the key is written to an already valid key in a key table, the already valid key is reset and associated metadata is invalidated.

4. The computing device of claim 2, wherein, if a same word portion of the key is not written more than once and a word portion of the key is not written out of order, the cryptoprocessor performs a key validation process.

5. The computing device of claim 4, wherein, in the key validation process, the cryptoprocessor determines if metadata associated with the key satisfies system privileges, and if so, the key is validated.

6. The computing device of claim 5, wherein, the associated metadata includes usage rules.

7. The computing device of claim 6, wherein, the usage rules include hardware usage rules and software usage rules.

8. The computing device of claim 5, wherein, if the key is validated, the key and the associated metadata are written to a key table.

9. The computing device of claim 1, wherein, the cryptoprocessor implements a key entry state machine to write the plurality of word portions of the key.

10. A method to validate a key comprising:
 writing a first word portion of a key, the key comprising a plurality of word portions; and
 writing a plurality of subsequent word portions of the key;
 wherein, if a same word portion of the key is written more than once, the key is reset, and, if the key is validated, a hardware cryptoprocessor utilizes the key to encrypt and decrypt data.

11. The method of claim 10, wherein, if a word portion of the key is written out of order, the key is reset.

12. The method of claim 10, wherein if a word portion of the key is written to an already valid key in a key table, the already valid key is reset and associated metadata is invalidated.

13. The method of claim 11, wherein, if a same word portion of the key is not written more than once and a word portion of the key is not written out of order, further comprising performing a key validation process.

14. The method of claim 13, wherein, the key validation process further comprises determining if metadata associated with the key satisfies system privileges, and if so, validating the key.

15. The method of claim 14, wherein, the associated metadata includes usage rules.

16. The method of claim 15, wherein, the usage rules include hardware usage rules and software usage rules.

17. The method of claim 14, wherein, if the key is validated, further comprising writing the key and the associated metadata to a key table.

18. A non-transitory computer-readable medium including code that, when executed by a hardware cryptoprocessor, causes the hardware cryptoprocessor to:
 write a first word portion of a key, the key comprising a plurality of word portions; and
 write a plurality of subsequent word portions of the key;
 wherein, if a same word portion of the key is written more than once, the key is reset, and, if the key is validated, the hardware cryptoprocessor utilizes the key to encrypt and decrypt data.

19. The non-transitory computer-readable medium of claim 18, wherein, if a word portion of the key is written out of order, the key is reset.

20. The non-transitory computer-readable medium of claim 19, wherein, if a same word portion of the key is not written more than once and a word portion of the key is not written out of order, further comprising code to perform a key validation process.

21. The non-transitory computer-readable medium of claim 20, wherein, the key validation process further comprises code to determine if metadata associated with the key satisfies system privileges, and if so, validates the key.

22. The non-transitory computer-readable medium of claim 21, wherein, the associated metadata includes usage rules.

23. The non-transitory computer-readable medium of claim 22, wherein, the usage rules include hardware usage rules and software usage rules.

24. The non-transitory computer-readable medium of claim 21, wherein, if the key is validated, further comprising code to write the key and the associated metadata to a key table.

25. A computing device comprising a hardware cryptoprocessor means further comprising:

means for writing a first word portion of a key, the key comprising a plurality of word portions; and means for writing a plurality of subsequent word portions of the key;

wherein, if a same word portion of the key is written more than once, the key is reset, and, if the key is validated, the hardware cryptoprocessor means utilizes the key to encrypt and decrypt data.

26. The computing device of claim 25, wherein, if a word portion of the key is written out of order, the key is reset.

27. The computing device of claim 26, further comprising means for performing a key validation process if a same word portion of the key is not written more than once and a word portion of the key is not written out of order.

28. The computing device of claim 27, further comprising means for determining if metadata associated with the key satisfies system privileges, and if so the key is validated.

29. The computing device of claim 28, wherein, the associated metadata includes usage rules.

30. The computing device of claim 29, wherein, the usage rules include hardware usage rules and software usage rules.

* * * * *